UNITED STATES PATENT OFFICE.

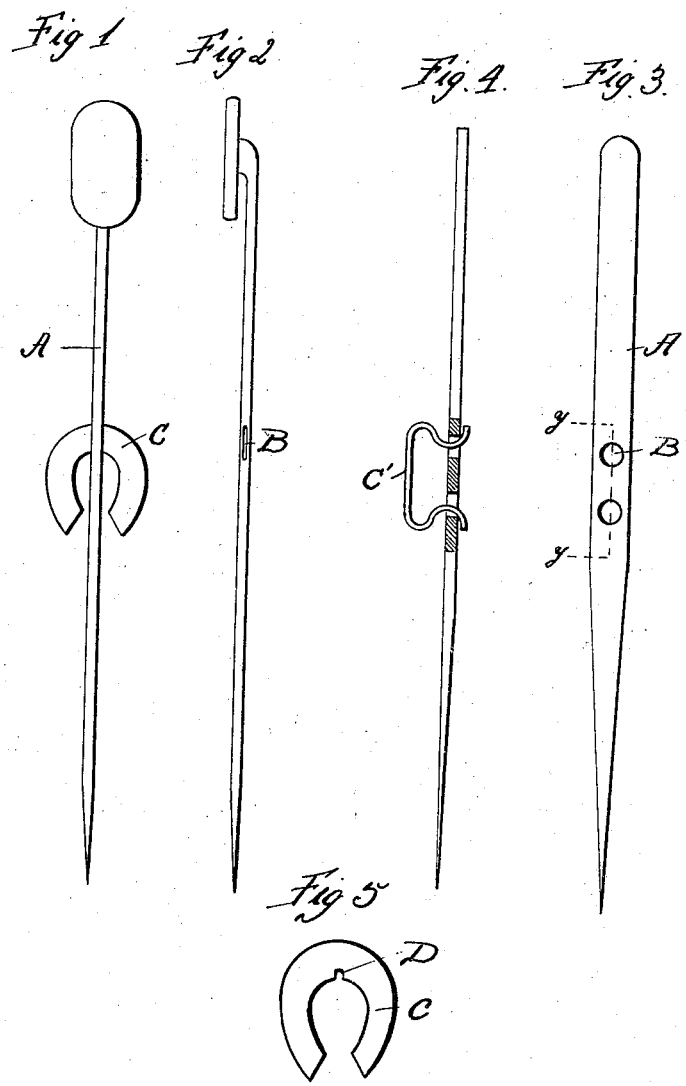

JOHN ST. GEORGE JOYCE, OF PHILADELPHIA, PENNSYLVANIA.

SAFETY SCARF-PIN.

No. 895,865.    Specification of Letters Patent.    Patented Aug. 11, 1908.

Application filed May 29, 1907. Serial No. 376,240.

*To all whom it may concern:*

Be it known that I, JOHN ST. GEORGE JOYCE, a citizen of the United States, residing at Philadelphia, county of Philadelphia, and State of Pennsylvania, have invented a certain new and useful Improvement in Safety Scarf-Pins, of which the following is a specification.

My invention relates to a new and useful improvement in safety scarf pins, and has for its object to so construct such a pin and provide a safety device therefor as to absolutely prevent the accidental withdrawal of the pin from the necktie or other goods in which it may be fastened, and at the same time the fastening device may be utilized as a further ornament to the pin.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a front view of a pin made in accordance with my improvement. Fig. 2, a side view, the pendant being omitted. Fig. 3, a view similar to Fig. 1 showing a slight modification of my improvement in which two holes are made in the pin for the reception of the safety device. Fig. 4, a side view, a portion being sectioned away on the line Y—Y to show the manner of attaching the safety device. Fig. 5, a front view of the pendant used in Figs. 1 and 2.

In carrying out my invention as here embodied, A represents the pin, which may be of ordinary construction with the exception that an elongated hole B is formed therein, and C represents the pendant which is also utilized as a safety device. This pendant has a notch D formed therein to engage with the lower wall of the slot B, and when the pin is inserted in the tie the pendant is passed through said slot and adjusted as shown in Fig. 1. The pin cannot be withdrawn from the scarf or tie, but when it is desired to withdraw the pin it is only necessary to remove the pendant which will permit the pin to be drawn out of the fabric.

In Figs. 3 and 4 in which I have shown a slight modification of my improvement, the pin A has formed therein two holes B' into which the ends of the safety device C' may be sprung, or the safety device may be sprung into the elongated slot B of Figs. 1 and 2.

The safety device in the form of a pendant may be of any fancy design or may be suitably ornamented so as to add to the appearance of the pin, and when such a device is used the pin is so inserted in the tie or scarf that the opening B is exposed on the front side of the scarf, and when the safety device is inserted therein it will also be exposed and give the appearance of a pendant suspended from the pin. The pin may have any suitable design or head as this forms no part of my invention.

Having thus fully described my invention, what I claim as new and useful, is—

1. As a new article of manufacture a perforated scarf pin and a safety device provided with means for locking it in the perforations of said pin.

2. The herein described combination of a perforated scarf pin and a safety device consisting of a single piece of metal adapted to be inserted within said perforation and locked therein, as specified.

In testimony whereof, I have hereunto affixed my signature in the presence of two subscribing witnesses.

JOHN ST. GEORGE JOYCE.

Witnesses:
  JOSEPH C. SMITH,
  S. M. GALLAGHER.